UNITED STATES PATENT OFFICE.

HEINRICH ROSE, OF HÖCHST-ON-THE-MAIN, GERMANY, ASSIGNOR TO FARB-WERKE, VORMALS MEISTER, LUCIUS & BRÜNING, OF SAME PLACE.

MANUFACTURE OF ALIZARINE-BLUE COLOR.

SPECIFICATION forming part of Letters Patent No. 263,965, dated September 5, 1882.

Application filed November 14, 1881. (Specimens.) Patented in England October 18, 1881, No. 4,531.

*To all whom it may concern:*

Be it known that I, Dr. HEINRICH ROSE, of Höchst-on-the-Main, Germany, have invented a new and useful Improvement in Coloring-Matter, of which the following is a specification.

My invention consists of an improved method of producing coloring-matters from alizarine-blue by heating alkaline salts of alizarine-blue with the bisulphites of the alkalies, as more fully described hereinafter.

The alizarine-blue to which I refer is the compound which can be produced from nitro-alizarine by treating the same with glycerine and sulphuric acid, and the formula of which is, according to the researches of Graebe, $C_{14}H_9NO_4$.

To produce in the first place the alkaline salt of the alizarine-blue, I add to the latter, suspended in water, a slight excess of an alkali or of an alkaline carbonate, and by filtering and washing I obtain the alkaline salt of the alizarine-blue in the form of a blue paste.

It is well known that alizarine-blue dissolves with difficulty (after eight to fourteen days) in bisulphites of alkalies. I have discovered, however, that the paste of the alkaline salt of alizarine-blue obtained as described above will dissolve quite quickly on adding to it a concentrated solution of alkaline bisulphite in excess. The compound of the alkaline salt of alizarine-blue with the bisulphite in the solution thus obtained will crystallize to a great extent. The mother lye filtered off from the crystals is used for dissolving the bisulphite in subsequent operations, or the parts of the above-described compound still in solution are precipitated by an addition of common salt.

This compound has a brownish-red appearance.

I claim as my invention—

1. The mode herein described of facilitating the production of coloring-matters from alizarine-blue, said mode consisting in first combining the alizarine-blue with alkalies, and then treating the alkaline salt thus obtained with the bisulphites of the alkalies, substantially as described.

2. The herein-described brownish-red coloring compound, consisting of an alkaline salt of alizarine-blue with an alkaline bisulphite.

In testimony whereof I have signed my name to this specification in the presence of two subscribing witnesses.

HEINRICH ROSE.

Witnesses:
FRANZ WIRTH,
FRANZ HASSLACHER.